US009358971B2

(12) United States Patent
Oki

(10) Patent No.: US 9,358,971 B2
(45) Date of Patent: Jun. 7, 2016

(54) POWER TRANSMISSION APPARATUS FOR HYBRID VEHICLE

(75) Inventor: Shogo Oki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1121 days.

(21) Appl. No.: 13/420,481

(22) Filed: Mar. 14, 2012

(65) Prior Publication Data
US 2012/0234134 A1 Sep. 20, 2012

(30) Foreign Application Priority Data

Mar. 17, 2011 (JP) ................. 2011-058905

(51) Int. Cl.
B60K 6/48 (2007.10)
B60W 10/119 (2012.01)
B60W 10/02 (2006.01)
B60W 10/06 (2006.01)
B60W 10/08 (2006.01)
B60W 10/107 (2012.01)
B60W 20/00 (2016.01)
B60K 6/543 (2007.10)
B60W 30/18 (2012.01)

(52) U.S. Cl.
CPC ............... *B60W 10/119* (2013.01); *B60K 6/48* (2013.01); *B60K 6/543* (2013.01); *B60W 10/02* (2013.01); *B60W 10/06* (2013.01); *B60W 10/08* (2013.01); *B60W 10/107* (2013.01); *B60W 20/00* (2013.01); *B60K 2006/4808* (2013.01); *B60K 2006/4825* (2013.01); *B60W 30/18127* (2013.01); *Y02T 10/626* (2013.01); *Y02T 10/6221* (2013.01); *Y02T 10/6252* (2013.01); *Y02T 10/6286* (2013.01); *Y10T 74/19051* (2015.01); *Y10T 74/19126* (2015.01)

(58) Field of Classification Search
CPC ........... F16H 37/02; F16H 37/06; B60K 6/36; B60K 6/38; B60K 6/48; B60K 6/543; B60K 2006/4808; B60K 2006/4825

USPC ................ 74/665 A, 665 L; 180/65.21, 65.25
See application file for complete search history.

(56) References Cited

U.S. PATENT DOCUMENTS 6,269,895 B1* 8/2001 Tanuguchi et al. ......... 180/65.25
2004/0124021 A1* 7/2004 Shirai et al. .................. 180/65.2
2007/0021259 A1* 1/2007 Tenberge ......................... 475/5

FOREIGN PATENT DOCUMENTS

| DE | 43 42 735 | * | 6/1995 |
|---|---|---|---|
| JP | 3633473 B2 | | 3/2005 |
| JP | 3743158 B2 | | 2/2006 |
| JP | 2007-261346 | * | 10/2007 |
| JP | 4226610 B2 | | 2/2009 |
| JP | 2009-268256 | * | 11/2009 |

* cited by examiner

Primary Examiner — William C Joyce
(74) Attorney, Agent, or Firm — McGinn IP Law Group PLLC

(57) ABSTRACT

A power transmission apparatus for a hybrid vehicle. An engine output shaft and a motor output shaft are coupled to a primary shaft of a continuously variable transmission installed in the power transmission apparatus. An output clutch is disposed between an output transmission shaft coupled to a drive wheel and a secondary shaft in order to switch these shafts between a coupled state and a released state, and a drive changeover clutch is disposed between the primary shaft and the output transmission shaft in order to switch these shafts between a coupled state and a released state. In a direct coupling mode where the output clutch is released and the drive changeover clutch is coupled, an engine output is transmitted to the drive wheel without passing through the continuously variable transmission.

10 Claims, 4 Drawing Sheets (A)

(B)

POWER TRANSMISSION APPARATUS FOR HYBRID VEHICLE

CROSS-REFERENCE TO RELATED APPLICATIONS

The present application claims priority from Japanese Patent Application No. 2011-058905 filed on Mar. 17, 2011, the entire contents of which are hereby incorporated by reference.

BACKGROUND OF THE INVENTION

1. Field of the Invention

The present invention relates to a power transmission apparatus for a hybrid vehicle, which transmits an engine output and a motor output to a drive wheel.

2. Description of the Related Art

In a hybrid vehicle that is installed with an engine and an electric motor so that an engine output and a motor output can be transmitted to a drive wheel, the engine output is transmitted to the drive wheel via a shift mechanism. In a hybrid vehicle installed with a shift mechanism, the engine and the electric motor may be arranged such that the engine is disposed on one end portion side of a transmission input shaft of the shift mechanism and the electric motor is disposed on the other end portion side, whereby the engine and the electric motor are disposed on either side of the shift mechanism, or such that the engine and the electric motor are disposed adjacent to each other on one end portion side of the transmission input shaft. In a hybrid vehicle having a shift mechanism, the engine output and the motor output are transmitted to the drive wheel via the shift mechanism. In the case where the electric motor is caused to serve as a generator in order to recover regenerative energy, regenerative torque from the drive wheel is transmitted to the electric motor via the shift mechanism.

Japanese Patent No. 4,226,610 describes a hybrid vehicle having a continuously variable transmission (CVT) as a shift mechanism, in which an engine and an electric motor are disposed on one end portion side of a primary shaft of the continuously variable shift mechanism. In this hybrid vehicle, a power transmission path for transmitting the engine output and the motor output to the drive wheel via the continuously variable transmission and a power transmission path for transmitting the motor output of the electric motor to the drive wheel without passing through the continuously variable transmission are switched by a clutch.

Japanese Patent No. 3,633,473 describes a hybrid vehicle having a planetary gear mechanism in addition to a continuously variable transmission, in which a shift mode for shifting using only the continuously variable transmission and a shift mode for shifting using both the continuously variable transmission and the planetary gear mechanism are switched by a clutch. Further, Japanese Patent No. 3,743,158 describes a power transmission apparatus that includes a continuously variable transmission and an infinitely variable transmission and transmits an engine output and a motor output to a drive wheel.

In many conventional hybrid vehicles such as those described above, the engine output and the motor output are ted to the drive via a shift mechanism, and in certain cases, the motor output alone may be transmitted directly to the drive wheel without passing through the shift mechanism. However, since the engine output is transmitted to the drive wheel via the shift mechanism, power transmission loss in the shift mechanism is inevitable.

Examples of the continuously variable transmission serving as the shift mechanism include a belt drive type mechanism and a traction drive type mechanism. In the belt drive system, a primary shaft having a primary pulley and a secondary shaft having a secondary pulley are provided, and groove widths of the pulleys are set to be variable. A power transmission element such as a belt is wound between the two pulleys, whereby rotation of the primary shaft is varied continuously via the power transmission element and transmitted to the secondary shaft. In the traction drive system, a primary shaft having an input disk and a primary shaft having an output disk are provided, a toroidal surface is formed on each of the disks, and a power roller is disposed between the toroidal surfaces as a power transmission element.

In the belt drive type continuously variable transmission, a tightening force oriented toward the belt other power transmission element must be exerted on the pulleys using a hydraulic pump during power transmission. Therefore, in a power transmission apparatus employing the continuously variable transmission, power loss inevitably occurs when activating the hydraulic pump, in addition to the power transmission loss occurring in the continuously variable transmission.

SUMMARY OF THE INVENTION

An object of the present invention is to improve a power transmission efficiency of a hybrid vehicle.

An aspect of the present invention provides a power transmission apparatus for a hybrid vehicle that transmits an engine output and a motor output to a drive wheel, the power transmission apparatus including: a continuously variable transmission that includes a primary shaft coupled to an engine output shaft and a motor output shaft, and a secondary shaft to which a rotation of the primary shaft is transmitted after being varied continuously by a power transmission element; an output clutch that is disposed between an output transmission shaft coupled to the drive wheel and the secondary shaft in order to switch the secondary shaft and the output transmission shaft to a coupled state in which a coupling is formed therebetween and a released state in which the coupling is released; and a drive changeover clutch that is disposed between the primary shaft and the output transmission shaft in order to switch the primary and the output transmission shaft to a coupled state in which coupling is formed therebetween and a released state in which the coupling s released. In a direct coupling mode where the output clutch is released and the drive changeover clutch is coupled, at least one of the engine output and the motor output is transmitted to the drive wheel without passing through the continuously variable transmission.

Preferably, in a shift mode where the output clutch is engaged and the drive changeover clutch is released, at least one of the engine output and the motor output should be transmitted to the drive wheel via the continuously variable transmission. Preferably, an electric motor including the motor output shaft should be a motor/generator, and in the direct coupling mode where the output clutch is released and the drive changeover clutch is coupled, the electric motor should be driven by the drive wheel to recover regenerative energy. Preferably, the primary shaft should be coupled to one end of the motor output shaft, and the drive changeover clutch should be coupled to another end of the motor output shaft. Preferably, the output transmission shaft should include: a transfer shaft coupled to the drive changeover clutch to be coaxial with the motor output shaft; a rear wheel output shaft that is coupled to the transfer shaft via a transfer clutch and transmits power to a rear wheel; and a front wheel output shaft that is coupled to the transfer shaft and transmits power to a front wheel.

The power transmission apparatus according to the present invention includes the direct coupling mode, in which the engine output and the motor output can be transmitted to the drive wheel directly without passing through the continuously variable transmission. Therefore, in this mode, power transmission loss occurring in the continuously variable transmission can be eliminated, enabling an improvement in power transmission efficiency and a corresponding improvement in fuel efficiency. Further, since power can be transmitted without passing through the continuously variable transmission, a hydraulic pump does not have to be activated in the direct coupling mode in order to perform a shift operation, and therefore pump loss can be prevented.

DESCRIPTION OF THE PREFERRED EMBODIMENTS

Figure 1:
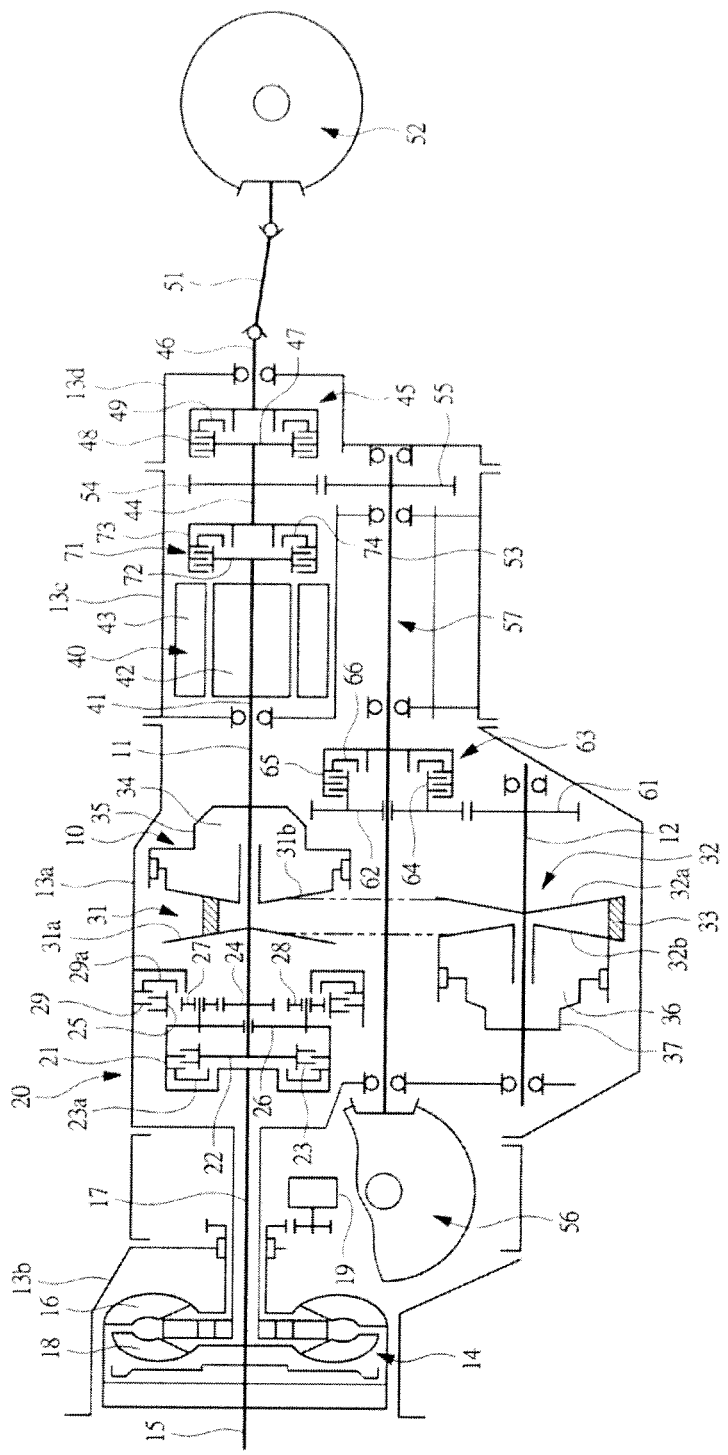
FIG. 1 is a skeleton diagram showing a power transmission apparatus for a hybrid vehicle according to an embodiment of the present invention.

Embodiments of the present invention will be described in detail below on the basis of the drawings. A power transmission apparatus shown in FIG. 1 includes a continuously variable transmission 10 serving as a shift mechanism. The continuously variable transmission 10 includes a primary shaft 11 serving as a transmission input shaft and a secondary shaft 12 serving as a transmission output shaft. The primary shaft 11 and the secondary shaft 12 are parallel to each other. The continuously variable transmission 10 is incorporated into a transmission case 13a, and the transmission case 13a is installed vertically in an unillustrated vehicle body, so that the primary shaft 11 and the secondary shaft 12 are each parallel to a travel direction.

A torque converter 14 is incorporated into a converter case 13b attached to a tip end portion of the transmission case 13a. The torque converter 14 includes a pump impeller 16 coupled to a crankshaft of an unillustrated engine, or in other words an engine output shaft 15, and a turbine runner 18 that faces the pump impeller 16 and is coupled to a turbine shaft 17. The power transmission apparatus includes an oil pump 19, and the oil pump 19 is driven by a pump shaft provided in the pump impeller 16 of the torque converter 14. The turbine shaft 17 of the torque converter 14 is coupled to one end portion of the primary shaft 11 by a forward-reverse changeover mechanism 20.

The forward-reverse changeover mechanism 20 includes a clutch drum 21 fixed to the turbine shaft 17 and a clutch hub 22 fixed to the primary shaft 11. A forward clutch 23 is formed by a plurality of friction plates disposed between the clutch drum 21 and the clutch hub 22. When the forward clutch 23 is engaged by a hydraulic piston 23a, rotation of the turbine shaft 17 is transmitted to the primary shaft 11 via the clutch hub 22 such that the primary shaft 11 rotates in an identical normal rotation direction to the turbine shaft 17. A sun gear 24 is fixed to the primary shaft 11, and a ring gear 25 is provided in the transmission case 13a to be free to rotate on a radial direction outer side of the sun gear 24. Two planetary pinion gears 27 and 28 that mesh with each other to form a pair are mounted to be free to rotate on a carrier 26 attached to the clutch drum 21. One of the pinion gears 27 meshes with the sun gear 24, while the other pinion gear 28 meshes with the ring gear 25. Note that in FIG. 1, the two pinion gears 27 and 28 are shown at a remove from each other to facilitate creation of the drawing. A reverse brake 29 is formed by a plurality of friction plates disposed between the ring gear 25 and the transmission case 13a. When the forward clutch 23 is disengaged and the reverse brake 29 is engaged by a hydraulic piston 29a, the primary shaft 11 rotates in an opposite rotation direction to the turbine shaft 17. When the primary shaft 11 is rotated in the normal rotation direction, the reverse brake 29 is set in a disengaged state.

As shown in FIG. 1, the primary shaft 11 is coupled by one end portion thereof to the engine output shaft 15 via the torque converter 14 and the forward-reverse changeover mechanism 20, whereby an engine output is input into the primary shaft 11.

A primary pulley 31 is provided on the primary shaft 11 of the continuously variable transmission 10. The primary pulley 31 includes a fixed pulley 31a fixed to the primary shaft 11, and a movable pulley 31b that opposes the fixed pulley 31a and is mounted on the primary shaft 11 to be free to slide in an axial direction via a ball spline or the like. Thus, an interval between conical surfaces of the pulleys, or in other words a pulley groove width, is variable. A secondary pulley 32 is provided on the secondary shaft 12 parallel to the primary shaft 11. The secondary pulley 32 includes a fixed pulley 32a fixed to the secondary shaft 12, and a movable pulley 32b that opposes the fixed pulley 32a and is mounted on the secondary shaft 12 to be free to slide in the axial direction via a ball spline or the like, whereby the pulley groove width is variable.

A belt 33 is wound between the primary pulley 31 and the secondary pulley 32 as a power transmission element. By varying the groove widths of the two pulleys 31 and 32, a winding diameter ratio of the belt 33 relative to the respective pulleys 31 and 32 is varied. As a result, a rotation speed of the secondary pulley 12 relative to the primary pulley 11 is shifted continuously. To vary the groove width of the primary pulley 31, a cylinder 35 that forms a primary oil chamber 34 together with the movable pulley 31b is attached to the primary shaft 11. To vary the groove width of the secondary pulley 32, a cylinder 37 that forms a secondary oil chamber 36 together with the movable pulley 32b is attached to the secondary shaft 12. Working oil is supplied to the primary oil chamber 34 and the secondary oil chamber 36 from the oil pump 19.

An electric motor 40 is mounted in a motor case 13c attached to a rear end portion of the transmission case 13a. The electric motor 40 includes a rotor 42 attached to a motor output shaft 41, and the motor output shaft 41 is coupled to another end portion of the primary shaft 11. The electric motor 40 includes a stator 43, into the interior of which the rotor 42 is incorporated, and the stator 43 is fixed to the motor case 13c. Thus, the primary shaft 11 is coupled to the engine output shaft 15 at a left end portion of FIG. 1 via the torque converter 14 and the forward-reverse changeover mechanism 20 and coupled to the motor output shaft 41 of the electric motor 40 at a right end portion, whereby the turbine shaft 17, the primary shaft 11, and the motor output shaft 41 are coaxial. The electric motor 40 is a motor/generator that serves not only as an electric motor but also as a power generator for recovering regenerative energy during braking and charging a battery therewith.

The power transmission apparatus shown in FIG. 1 is installed in an all-wheel drive vehicle, or in other words a four-wheel drive type vehicle, in which both front wheels and rear wheels serve as drive wheels such that power can be transmitted thereto. A transfer case 13d is attached to a rear end portion of the motor case 13c. A transfer clutch 45 is attached to a transfer shaft 44 that is disposed in the motor case 13c so as to project into the transfer case 13d, and the transfer shaft 44 is coupled to a rear wheel output shaft 46 by the transfer clutch 45. The transfer clutch 45 includes a clutch hub 47 attached to the transfer shaft 44 and a clutch drum 48 attached to the rear wheel output shaft 46, and a plurality of friction plates are provided therebetween. When the friction plates are engaged by a hydraulic piston 49, the transfer shaft 44 and the rear wheel output shaft 46 are coupled. The rear wheel output shaft 16 is coupled to a rear differential mechanism 52 by a propeller shaft 51 such that an output is transmitted from the transfer shaft 44 to the unillustrated rear wheels as drive wheels via the propeller shaft 51.

A front wheel output shaft 53 is mounted in the transmission case 13a to be parallel to the primary shaft 11 and the secondary shaft 12. The front wheel output shaft 53 is coupled to the transfer shaft 44 by a gear pair constituted by a gear 54 attached to the transfer shaft 44 and a gear 55 attached to the front wheel output shaft 53 so as to mesh with the gear 54. The front wheel output shaft 53 is coupled to a front differential mechanism 56 such that an output is transmitted from the transfer shaft 44 to the unillustrated front wheels serving as drive wheels via the front wheel output shaft 53. When the transfer clutch 45 is engaged, the engine output and so on is transmitted to the front wheels and the rear wheels. When the transfer clutch 45 is disengaged, on the other hand, the engine output and so on is transmitted only to the front wheels.

The transfer shaft 44, the rear wheel output shaft 46, and the front wheel output shaft 53 together constitute an output transmission shaft 57 for transmitting power to the front wheels and rear wheels serving as the drive wheels. To transmit the rotation of the secondary shaft 12 to the output transmission shaft 57, a gear 61 attached to the secondary shaft 12 meshes with a gear 62 mounted to be free to rotate on the front wheel output shaft 53. An output clutch 63 for switching the output transmission shaft 57 and the secondary shaft 12 between a coupled state in which the two shafts are coupled and a released state in which the coupling is released is disposed between the gear 62 and the front wheel output shaft 53. The output clutch 63 includes a clutch hub 64 attached to the gear 62 and a clutch drum 65 attached to the front wheel output shaft 53, and a clutch plate is provided therebetween. When the clutch plate is engaged by a hydraulic piston 66, the secondary shaft 12 and the output transmission shaft 57 enter the coupled state.

A drive changeover clutch 71 is disposed between the motor output shaft 41 and the transfer shaft 44. The drive changeover clutch 71 includes a clutch hub 72 attached to the motor output shaft 41 and a clutch drum 73 attached to the transfer shaft 44, and a plurality of friction plates are provided therebetween. When the friction plates are engaged by a hydraulic piston 74, the primary shaft 11 and the output transmission shaft 57 are coupled via the motor output shaft 41 by the drive changeover clutch 71. When the friction plates are disengaged, on the other hand, the coupling is released such that the shafts are uncoupled.

Hence, the drive changeover clutch 71 is disposed between the primary shaft 11 to which the motor output shaft 41 is coupled and the output transmission and therefore, when the drive changeover clutch is switched ON, or in other words engaged, during high-speed cruising, for example, the engine output shaft 15 is directly coupled to the output transmission shaft 57 via the motor output shaft 41.

Working oil the oil sump 19, which is driven by the engine, is supplied to the primary oil chamber 34, the secondary oil chamber 36, the hydraulic pistons 74, 66 and 49, and so on. However, an electric oil pump may be attached to the power transmission apparatus instead of or in addition to the engine-driven oil pump 19.

Figure 2:
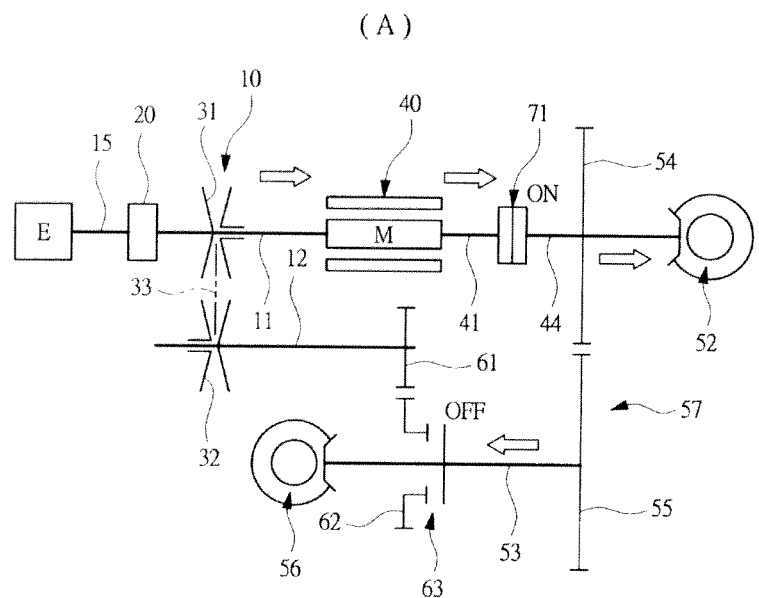
FIG. 2A is a schematic diagram showing a power transmission path in a direct coupling mode.
FIG. 2B is a schematic diagram showing a power transmission path in a shift mode.
Figure 2:
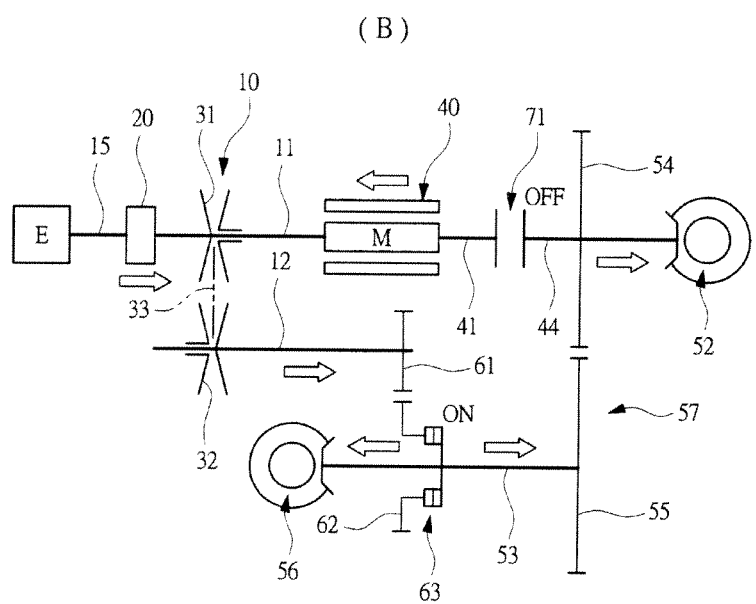

FIG. 2A is a schematic diagram showing a power transmission path in a coupling mode where the drive changeover clutch 71 is engaged and the output clutch 63 is disengaged. The power transmission path is indicated by arrows in the drawing. Here, the engine output is transmitted directly to the front and rear drive wheels by the output transmission shaft 57 without passing through the continuously variable transmission 10. When the engine is driven, the engine output is transmitted to the drive wheels, and when the electric motor 40 is driven, the motor output is transmitted to the drive wheels. Hence, at least one of the engine output and the motor output can be transmitted to the drive wheels.

The engine output is transmitted to the output transmission shaft 57 in a directly coupled state, that is, without passing through the continuously variable transmission 10. Therefore, power loss occurring during a shift operation in the continuously variable transmission 10 is eliminated, and a force for pressing the primary pulley 31 and secondary pulley 32 against the belt 33 need not be generated in the pulleys. As a power transmission efficiency can be improved.

FIG. 1 shows an all-wheel drive type power transmission apparatus, but in the case of an FF type owe transmission apparatus in which only the front wheels serve as the drive wheels, the transfer clutch 45 is removed. Meanwhile, in the case of an FR type power transmission apparatus in which only the rear wheels serve as the drive wheels, the transfer clutch 45 and the front wheel output shaft 53 are removed, while the secondary shaft 12 is coupled to the rear wheel output shaft 46 via a gear and a chain.

FIG. 2B is a schematic diagram showing a power transmission path in a shift mode where the drive changeover clutch 71 is disengaged and the output clutch 63 is engaged. At this time, the engine output and the motor output are transmitted to the output transmission shaft 57 via the continuously variable transmission 10, and therefore the shift mode is set when the vehicle begins to travel, travels at low speed, and so on.

Figure 3:
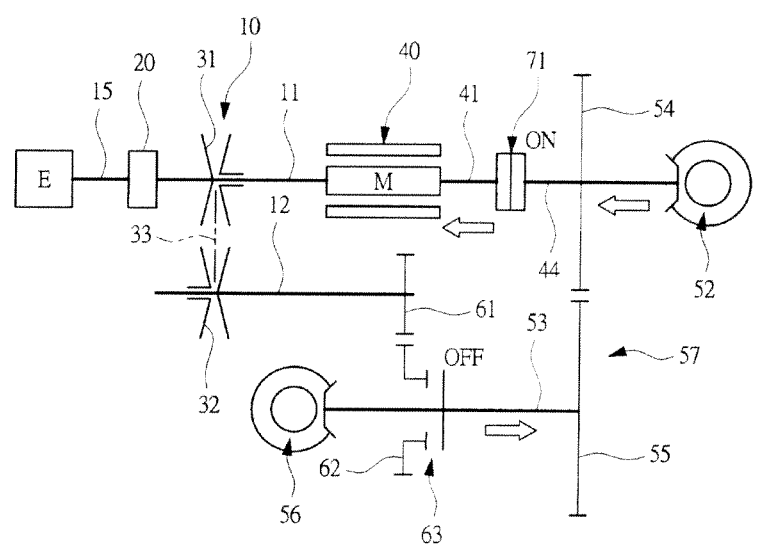
FIG. 3 is a schematic diagram showing a power transmission path during regenerative braking in the direct coupling mode.

FIG. 3 is a schematic diagram showing a power transmission path when the power transmission apparatus is in the coupling mode, similarly to FIG. 2A, and power is generated by the electric motor 40 during regenerative braking. When regenerative braking is performed in the direct coupling mode, power generation torque is transmitted to the electric motor 40 from the output transmission shaft 57 directly, that is, without passing through the continuously variable transmission 10, and therefore a regeneration efficiency can be improved.

Figure 4:
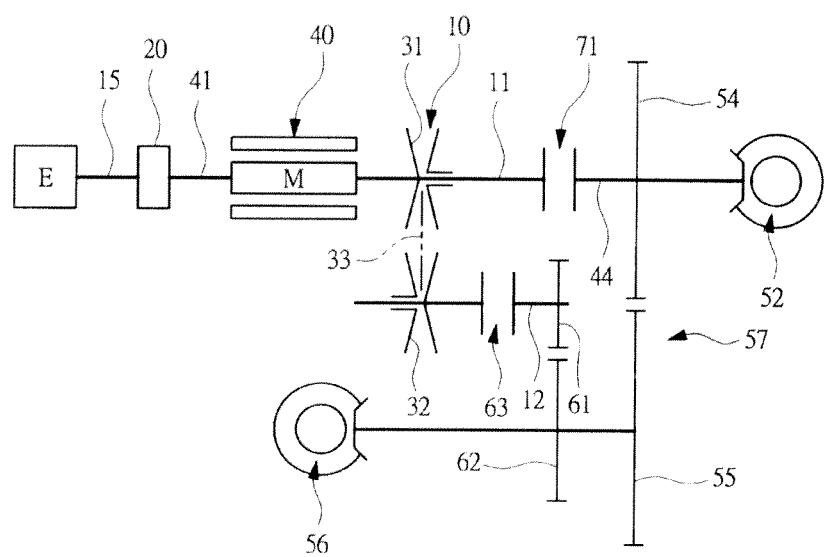
FIG. 4 is a schematic diagram showing a power transmission apparatus for a hybrid vehicle according to another embodiment of the present invention.

FIG. 4 is a schematic diagram showing a power transmission apparatus for a hybrid vehicle according to another embodiment of the present invention.

In this power transmission apparatus, the electric motor 40 is disposed on the engine side of the primary pulley 31. The motor output shaft 41 is disposed on the engine side of the primary shaft 11, and therefore the drive changeover clutch 71 is disposed between the primary shaft 11 and the transfer shaft 44. Hence, in the power transmission apparatus shown in FIG. 4, one end portion side of the primary shaft 11 is coupled to the engine output shaft 15 via the motor output shaft 41, and the drive changeover clutch 71 is disposed between the other end portion of the primary shaft 11 and the output transmission shaft 57. In the power transmission apparatus shown in FIG. 1, on the other hand, the primary shaft 11 is coupled to one end portion of the motor output shaft 41, and the drive changeover clutch 71 is disposed between the other end portion of the motor output shaft 41 and the output transmission shaft 57.

In FIG. 4, the output clutch 63 for switching the output transmission shaft 57 and the secondary shaft 12 between the coupled state in which the two shafts are coupled and the released state in which the coupling is released is provided on the secondary shaft 12. As long as the output clutch 63 is provided between the output transmission shaft 57 and the secondary shaft 12, a position thereof may be set as desired, and in the power transmission apparatus shown in FIG. 1, the output shaft 63 may likewise be provided on the secondary shaft 12, as shown in FIG. 4.

The present invention is not limited to the embodiments described above, and may be subjected to various modifications within a scope that does not depart from the spirit thereof. For example, the continuously variable transmission 10 shown in the drawings is a belt drive type mechanism but may be a traction drive type mechanism.

What is claimed is:

1. A power transmission apparatus for a hybrid vehicle that transmits an engine output and a motor output to a drive wheel, the power transmission apparatus comprising:
    a continuously variable transmission that includes a primary shaft coupled to an engine output shaft and a motor output shaft, and a secondary shaft to which a rotation of the primary shaft is transmitted after being varied continuously by a power transmission element;
    an output clutch that is disposed between an output transmission shaft coupled to the drive wheel and the secondary shaft in order to switch the secondary shaft and the output transmission shaft to a coupled state in which a coupling is formed therebetween and a released state in which the coupling is released; and
    a drive changeover clutch that is disposed between the primary shaft and the output transmission shaft in order to switch the primary shaft and the output transmission shaft to a coupled state in which a coupling is formed therebetween and a released state in which the coupling is released,
    wherein, in a direct coupling mode where the output clutch is released and the drive changeover clutch is coupled, at least one of the engine output and the motor output is transmitted to the drive wheel without passing through the continuously variable transmission, and
    wherein the primary shaft is coupled to one end of the motor output shaft, and the drive changeover clutch is coupled to another end of the motor output shaft.

2. The power transmission apparatus for a hybrid vehicle according to claim 1, wherein, in a shift mode where the output clutch is engaged and the drive changeover clutch is released, at least one of the engine output and the motor output is transmitted to the drive wheel via the continuously variable transmission.

3. The power transmission apparatus for a hybrid vehicle according to claim 2, wherein an electric motor including the motor output shaft is a motor/generator, and
    in the direct coupling mode where the output clutch is released and the drive changeover clutch is coupled, the electric motor is driven by the drive wheel to collect regenerative energy.

4. The power transmission apparatus for a hybrid vehicle according to claim 3, wherein the output transmission shaft includes:
    a transfer shaft coupled to the drive changeover clutch to be coaxial with the motor output shaft;
    a rear wheel output shaft that is coupled to the transfer shaft via a transfer clutch and transmits power to a rear wheel; and
    a front wheel output shaft that is coupled to the transfer shaft and transmits power to a front wheel.

5. The power transmission apparatus for a hybrid vehicle according to claim 2, wherein the output transmission shaft includes:
    a transfer shaft coupled to the drive changeover clutch to be coaxial with the motor output shaft;
    a rear wheel output shaft that is coupled to the transfer shaft via a transfer clutch and transmits power to a rear wheel; and
    a front wheel output shaft that is coupled to the transfer shaft and transmits power to a front wheel.

6. The power transmission apparatus for a hybrid vehicle according to claim 1, wherein an electric motor including the motor output shaft is a motor/generator, and
    in the direct coupling mode where the output clutch is released and the drive changeover clutch is coupled, the electric motor is driven by the drive wheel to collect regenerative energy.

7. The power transmission apparatus for a hybrid vehicle according to claim 6, wherein the output transmission shaft includes:
    a transfer shaft coupled to the drive changeover clutch to be coaxial with the motor output shaft;
    a rear wheel output shaft that is coupled to the transfer shaft via a transfer clutch and transmits power to a rear wheel; and
    a front wheel output shaft that is coupled to the transfer shaft and transmits power to a front wheel.

8. The power transmission apparatus for a hybrid vehicle according to claim 1, wherein the output transmission shaft includes:
    a transfer shaft coupled to the drive changeover clutch to be coaxial with the motor output shaft;
    a rear wheel output shaft that is coupled to the transfer shaft via a transfer clutch and transmits power to a rear wheel; and
    a front wheel output shaft that is coupled to the transfer shaft and transmits power to a front wheel.

9. A power transmission apparatus for a hybrid vehicle that transmits an engine output and a motor output to a drive wheel including at least one of a front wheel and a rear wheel, the power transmission apparatus comprising:
    a continuously variable transmission that includes a primary shaft coupled to an engine output shaft and a motor output shaft, and a secondary shaft to which a rotation of the primary shaft is transmitted after being varied continuously by a power transmission element;
    an output clutch that is disposed between an output transmission shaft coupled to the drive wheel and the secondary shaft in order to switch the secondary shaft and the output transmission shaft to a coupled state in which a coupling is formed therebetween and a released state in which the coupling is released; and a drive changeover clutch that is disposed between the primary shaft and the output transmission shaft in order to switch the primary shaft and the output transmission shaft to a coupled state in which a coupling is formed therebetween and a released state in which the coupling is released, wherein, in a direct coupling mode where the output clutch is released and the drive changeover clutch is coupled, at least one of the engine output and the motor output is transmitted to the drive wheel without passing through the continuously variable transmission, and wherein the output transmission shaft includes:
- a transfer shaft coupled to the drive changeover clutch to be coaxial with the motor output shaft;
- a front wheel output shaft that is coupled to the transfer shaft and transmits power to the front wheel; and,
- a rear wheel output shaft that is coupled to the transfer shaft via a transfer clutch and transmits power to the rear wheel.

10. A power transmission apparatus for a hybrid vehicle that transmits an engine output and a motor output to a drive wheel including at least one of a front wheel and a rear wheel, the power transmission apparatus comprising:
- a continuously variable transmission that includes a primary shaft coupled to an engine output shaft and a motor output shaft, and a secondary shaft to which a rotation of the primary shaft is transmitted after being varied continuously by a power transmission element;
- an output clutch that is disposed between an output transmission shaft coupled to the drive wheel and the secondary shaft in order to switch the secondary shaft and the output transmission shaft to a coupled state in which a coupling is formed therebetween and a released state in which the coupling is released; and
- a drive changeover clutch that is disposed between the primary shaft and the output transmission shaft in order to switch the primary shaft and the output transmission shaft to a coupled state in which a coupling is formed therebetween and a released state in which the coupling is released, wherein, in a direct coupling mode where the output clutch is released and the drive changeover clutch is coupled, at least one of the engine output and the motor output is transmitted to the drive wheel without passing through the continuously variable transmission, and wherein the output transmission shaft includes:
- a transfer shaft coupled to the drive changeover clutch to be coaxial with the motor output shaft; and
- a front wheel output shaft that is coupled to the transfer shaft and transmits power to the front wheel, wherein the primary shaft is coupled to one end of the motor output shaft, and the drive changeover clutch is coupled to another end of the motor output shaft.

* * * * *